Figure 1:
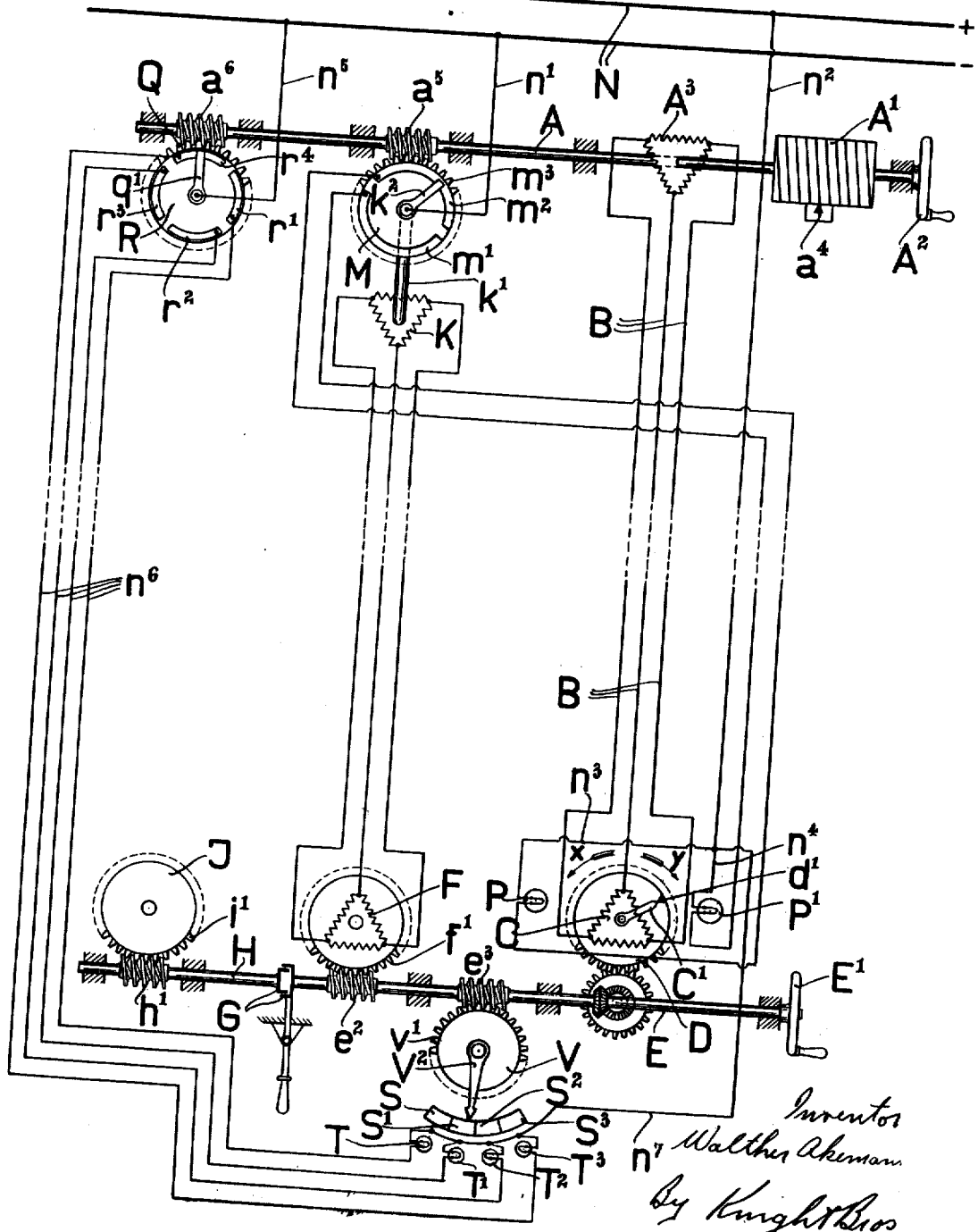

W. AKEMANN.
LONG DISTANCE SIGNAL AND CONTROL SYSTEM.
APPLICATION FILED SEPT. 3, 1920.

1,375,437.

Patented Apr. 19, 1921.
2 SHEETS—SHEET 1.

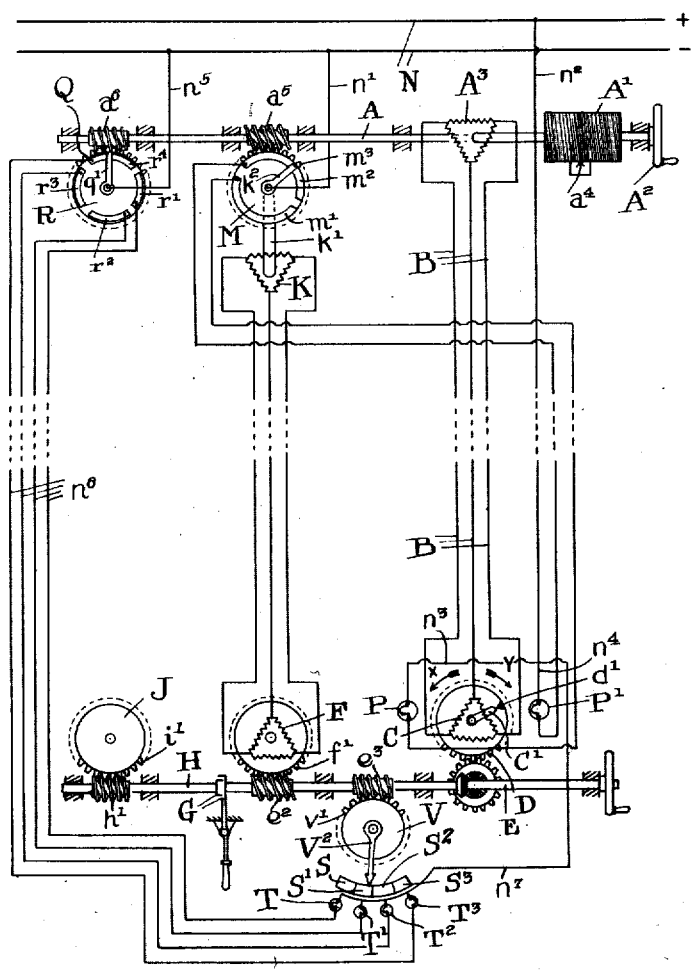

UNITED STATES PATENT OFFICE.

WALTHER AKEMANN, OF ESSEN, GERMANY, ASSIGNOR TO FRIED. KRUPP AKTIEN-GESELLSCHAFT, OF ESSEN-ON-THE-RUHR, GERMANY.

LONG-DISTANCE SIGNAL AND CONTROL SYSTEM.

1,375,437. Specification of Letters Patent. Patented Apr. 19, 1921.

Application filed September 3, 1920. Serial No. 408,069.

*To all whom it may concern:*

Be it known that I, Dr. WALTHER AKEMANN, residing at Essen, Germany, a citizen of the German Republic, have invented a certain new and useful Improvement in Long-Distance Signals and Control Systems, of which the following is a specification.

This invention relates to arrangements for the indication at a distance of the positions of pointers or the like with a synchronously acting transmitting and receiving system, a coöperating pointer positively connected to the object to be adjusted and coördinated to the pointer of the receiver and with an apparatus for indicating both the direction of rotation required for the driving member of the coöperating pointer, and also the position in which the angular position of the object to be adjusted differs from that of the transmitter by less than a revolution of the coöperating pointer.

The object of the invention is first and foremost, to provide an arrangement of this kind in which it is possible at any time, to ascertain at the receiving station the exact difference which exists in the adjustments of the transmitter and the object to be adjusted, and which therefore permits the duration of the adjusting operation to be substantially shortened by rotating the driving member of the object to be adjusted at an increased speed so long as the said difference is comparatively great. The object of the invention is secondly to provide arrangements of the kind last mentioned, the range of adjustment of which is a multiple of the range of adjustment obtained in consideration of unavoidable errors of transmission.

Figure 1 is a diagrammatic view of an apparatus constructed in accordance with my invention and Fig. 2 is a similar view showing a slightly modified form of my invention.

Upon a shaft A which serves to drive a transmitter $A^3$ is keyed a drum $A^1$ provided with a series of distance graduations and which can be rotated together with the transmitter $A^3$ by means of a hand wheel $A^2$. The rotation of the transmitter $A^3$ is transmitted by conductors B to a synchronously acting receiver C in the well known manner and the position of which receiver is read off by means of a pointer $C^1$ rigidly connected to the armature of the receiver and by means of a mark $d^1$, which is arranged on the periphery of a disk D adapted to rotate freely with respect to the pointer $C^1$. The disk D is positively connected by means of a toothed wheel gearing shown in the drawing to a shaft E which is provided with a hand wheel $E^1$ and is connected in its turn by the aid of a worm wheel gearing $e^2 f^1$ to the rotating part of an auxiliary transmitter F and by a clutch G which can be thrown in and out of operation to a coaxial shaft H. This shaft H is in its turn positively connected by a worm wheel gearing $h^1 i^1$ with the object J to be adjusted. The ratio of transmission of the toothed wheel gearing provided for the driving of the disk D is so chosen, that the disk D makes the same number of revolutions as the armature of the transmitter $A^3$, when the object J to be adjusted is moved over the whole range of its adjustment. The ratio of transmission of the gearing $e^2 f^1$ is such that a single revolution of the auxiliary transmitter F corresponds to the entire range of adjustment of the object J to be adjusted.

The auxiliary transmitter F mounted at the receiving station is connected to an auxiliary receiver K mounted at the transmitting station and acts synchronously therewith and with the shaft $k^1$ of the receiver K which carries a contact arm $k^2$. Arranged co-axially with the receiver K and the contact arm $k^2$ is a contact disk M which is provided with two contacts $m^1$ and $m^2$ and is adapted to rotate relatively to the shaft $k^1$ and is driven through a worm wheel gearing $m^3$ $a^5$. The ratio of transmission of the gearing $a^5$ $m^3$ is equal to the ratio of transmission of the gearing $e^2 f^1$ and is so proportioned that a single revolution of the contact disk M corresponds to the entire range of adjustment of the drum $A^1$. The contact disk M with the contacts $m^1$ and $m^2$ and the arm $k^2$ form together a contact device, the function of which is to open or close a signaling circuit, according to the position of the arm $k^2$ relatively to the contacts $m^1$ and $m^2$. For this purpose the gap between the contacts $m^1$ and $m^2$ is so chosen that when the arm $k^2$ moves from the contact $m^1$ to the contact $m^2$ the pointer $C^1$ of the receiver C makes a complete revolution. Within this space of a complete revolution of the pointer of the receiver the pointer $C^1$ can therefore move away from the mark $d^1$ without the contact device $k^2$ M coming into action.

From the source of continuous current N at the transmitting station a conductor $n^1$ leads to the contact arm $k^2$ and a second conductor $n^2$ leads to the receiving station where it branches into the conductors $n^3$ and $n^4$. These conductors $n^3$ and $n^4$ each pass across signal lamps P and $p^1$ back to the transmitting station where they are connected to the contacts $m^1$ and $m^2$ of the contact disk M. On the receiver C C$^1$ are provided two arrows $x$ and $y$ which indicate the two directions of rotation of the disk D and which are so arranged with respect to the signal lamps P and P$^1$ that they are illuminated when the lamps light up and thus allow it to be seen, in which direction of rotation the disk D is to be rotated, when the object to be adjusted, is adjusted.

Now according to the present invention upon the transmitter shaft A is also keyed a worm $a^6$ which gears with a worm wheel Q, the shaft of which carries a contact arm $q^1$. The ratio of transmission of the worm wheel gearing $a^6$ Q is so chosen that a complete revolution of the contact arm $q^1$ corresponds to the entire range of adjustment of the transmitter A$^3$. When the worm wheel Q rotates the contact arm $q^1$ slides over a disk R fixed in space which carries on its end face next to the contact arm $q^1$ four contacts $r^1$, $r^2$, $r^3$ and $r^4$ each of which extends over about a quarter of a circle and is separated from the next one by a gap equal to the width of the contact arm $q^1$. The contact arm $q^1$ is connected by a conductor $n^5$ to the source of continuous current N, and conductors $n^6$ also lead from the contacts $r^1$, $r^2$, $r^3$, $r^4$ to four lamps T, T$^1$, T$^2$ and T$^3$ which are arranged on the arc of a circle and behind ground glass disk S, S$^1$, S$^2$ and S$^3$. From the lamps a common conductor $n^7$, connected to the conductor $n^2$ leads back to the source N of continuous current. The contact device formed by the parts $q^1$ and R, $r^1$, $r^2$, $r^3$, $r^4$ in conjunction with the signaling arrangement formed by the four illuminated panels S, S$^1$, S$^2$, S$^3$ enables the man who operates the hand wheel E$^1$ to ascertain, by the lighting up of that particular lamp panel, which at that moment receives current through the said contact device, in which part of its adjustment the transmitter A$^3$ is situated.

Positively connected to the shaft E provided for the driving of the object J to be adjusted by a worm wheel gearing $e^3$ $v^1$ is a worm wheel V, the shaft of which carries a pointer V$^2$ the point of which points to one of the panels S, S$^1$, S$^2$, S$^3$. The ratio of transmission of the worm wheel gearing $e^3$ $v^1$ is so fixed that the pointer V$^2$ will have rotated from the outer edge of the panel S to the outer edge of the panel S$^3$ by the time that the shaft E has been rotated by an angular amount corresponding to the entire range of adjustment of the object J. As, according to what has been said above, the lighting up of one of the panels S, S$^1$, S$^2$ and S$^3$ at the receiving station allows the approximate adjustment of the transmitter A$^3$ to be ascertained and as also the position in which the pointer V$^2$ is at this instant indicates the approximate position of the object J to be adjusted the signaling device formed by the parts V$^2$, S, S$^1$, S$^2$, S$^3$ affords the individual who operates the hand wheel E$^1$ the possibility of ascertaining whether the position of the object J to be adjusted corresponds approximately to that of the transmitter A$^3$ or whether there is a great difference between both positions.

The description of the method of using the arrangement will be begun on the assumption that all the parts are in the position shown in the drawing that is to say that the transmitter A$^3$ has already made the number of revolutions corresponding to the position of the mark $a^4$ on the graduated drum A$^1$ also that the pointer C$^1$ of the receiver is exactly opposite the mark $d^1$ and the contact arm $k^2$ is touching the contact $m^2$ so that the signal lamp $p^1$ situated on the right hand side of the receiver C illuminates the arrow $y$, which indicates the direction and that finally the contact arm $q^1$ is touching the contact $r^4$ and consequently causes the signal lamp T$^3$ farthest to the right to light up and therefore illuminate the lamp panel S$^3$, while the pointer V$^2$ may be adjusted to the lamp panel S$^1$ belonging to the lamp T$^1$. At the same time the clutch is in the operative position i. e. thrown in and the object to be adjusted is in the position corresponding to the position of the pointer V$^2$. In order now to carry out the adjustment of the object J prescribed from the transmitting station the driving shaft E must first be rotated in the direction of rotation indicated by the illuminating directing arrow $y$ until the pointer V$^2$ has reached the lamp panel S$^3$ belonging to the lamp T$^3$. This part of the adjustment may be carried out at great speed, as the attendant, who rotates the hand wheel E can ascertain from the fact that the pointer V$^2$ has not yet reached the lamp panel S$^3$ just illuminated, and that there is still a great difference between the adjustment of the object J and of the transmitter A$^3$ and that he need therefore have no fear that by rapidly rotating the shaft E, he will bring the object J beyond the position prescribed by the transmitter A$^3$. As soon as the pointer V$^2$ has reached the lamp panel S$^3$ just illuminated, the man who rotates the hand wheel, turns it at a lower speed as he sees from the position of the pointer V$^2$ on the illuminated lamp panel that the adjustment of the object J prescribed by the transmitter A³ will soon be reached. During the rotation of the shaft E the contact arm $k^2$ owing to its connection with the receiver K moves slowly in a counter clockwise direction until it finally arrives in the intermediate position between the contacts $m^1$ and $m^2$. At this instant the lamp P¹ goes out and the shaft E need now be only rotated so much farther until the mark $d^1$ is brought exactly opposite the pointer C¹ of the receiver in the course of one revolution of the shaft E. At this instant the adjustment of the object J is completed.

On a subsequent fresh movement of the transmitter shaft A, which for example may take place in the opposite direction to which it did hitherto and may continue until the contact arm $q^1$ touches the contact $r^3$, so that the signal lamp T² now lights up and therefore illuminates the lamp panel S² while the pointer V² still points to the lamp panel S³ belonging to the lamp T³, the arm $k^2$ comes into contact with the contact $m^1$, so that the lamp P illuminates the directing arrow $x$. The man attending to the object J to be adjusted must accordingly rotate the driving shaft E in the opposite direction to which he formerly did and with an increased velocity until the pointer V² has reached the panel S² illuminated by the lamp T² and with a decreased velocity until the lamp P on the receiver again goes out and the mark $d^1$ again stands exactly opposite the pointer C¹ of the receiver.

Instead of the signal lamp T to T³ and the ground glass disks S to S³ drop shutters or similiar optical signaling devices may of course be used.

Without altering anything in the essential features of the invention the arrangement described may also be constructed in the following way: Instead of the equal ratios of transmission of the gearings $a^5 m^3$ and $e^2 f^1$ being chosen so that a single rotation of the contact disk M or of the auxiliary transmitter P corresponds to the entire range of adjustment of the transmitter A³ or of the object J to be adjusted the ratios of transmission of these gearings may be so fixed that as many revolutions of the contact disk M or of the auxiliary transmitter F correspond to the entire range of adjustment of the transmitter A³ or of the object J to be adjusted, as there are illuminatable panels in the signaling device provided at the receiving station, that is to say, that in the arrangement shown in the drawing, four revolutions of the auxiliary transmitter F and of the contact disk M correspond to the entire range of adjustment. Furthermore the graduated drum A¹ may be provided with a series of graduations which suffices for four times the range of adjustment of the arrangement first described. In other respects nothing is altered from the arrangement shown in the drawing.

From the aforesaid alteration in the ratio of transmission it follows firstly, that an entire revolution of the auxiliary transmitter F and of the contact disk M is no longer corresponded to by an angle of rotation of the pointer V² which reaches from the outer edge of the lamp panel S to the outer edge of the lamp panel S³ but by a new angle of rotation, which is bounded by both edges of one and the same lamp panel, and secondly that on the rotation of the shaft A over the entire range of adjustment of the transmitter A³ the contact disk M makes four revolutions and the lamps P and P¹ are consequently lighted up four times. In the modified arrangement therefore the lamps P and P¹ are no longer suitable for indicating the required direction of rotation of the shaft E.

Assume that the transmitter A³ takes up a position in which, for example, the lamp panel S² is illuminated, and the object J to be adjusted is in an angular position which corresponds to an adjustment of the pointer directed to any one of the other lamp panels S, S¹ or S³. In this case what the sole deciding factor for the direction of rotation required is, is whether the lamp panel just illuminated is situated to the right or the left of the pointer V². According as the illuminated lamp panel is on the left or right of the pointer V², the man who attends to the adjustments of the object, has to turn the hand wheel E¹ in a clock-wise direction or in the opposite direction. This rotation may take place at an increased speed as the attendant sees from the fact that the pointer does not point to the illuminated panel, that the adjustment of the object J is different by a large amount from that of the transmitter A³. Immediately the pointer V² has reached the illuminated panel S², that lamp P or P¹ lights up which confirms the direction of rotation previously given by the position of the pointer V² with respect to the illuminated lamp panel S². The attendant, now pointing the gun according to the directing arrow $x$ or $y$ just illuminated, therefor continues to turn the hand wheel E¹ in the direction of the illuminated directing arrow until the directing arrow is no longer illuminated. From this instant he continues the rotation of the hand wheel E¹ until in the course of the next revolution of the disk D the marks C¹ and $d^1$ coincide. As soon as this happens, i. e., as soon as the pointer V² points to the illuminated lamp panel, neither of the directing arrows $x$ and $y$ is illuminated any longer and the marks C¹ and $d^1$ coincide, the object J has reached the adjustment prescribed by the transmitter A³.

The number mentioned of the ratios of transmission causes one revolution of t auxiliary transmitter F and of the contact disk M to be corresponded to by only a quarter of the entire range of adjustment of the transmitter A³ and of the object J to be adjusted, that is to say it is possible to make the range of adjustment of the transmitter A³ and of the object J to be adjusted four times as large as in the arrangement at first described, without it being necessary, to alter anything in the existing electrical transmission devices and without the accuracy of adjustment obtainable being any less.

Claims.

1. An apparatus of the class described, comprising a transmitter, a transmitter shaft, a receiver operated by and synchronously with said transmitter, a pointer rotatable with said receiver, a coöperating pointer coördinate to the pointer of the receiver, an object to be adjusted, means for adjusting said object, said coöperating pointer being operated by said object-adjusting means, electrical means for indicating the direction of rotation required for the object-adjusting means, said means being controlled by a contact device, said contact device being controlled jointly by said object-adjusting means and said transmitter shaft, a series of optical signals for indicating the amount of adjustment required for the object, a movable pointer coöperating with said signals, said pointer being positively connected to and operated by the object adjusting means, and electrical means controlled by the transmitter shaft for selectively operating the series of optical signals.

2. An apparatus of the class described, which comprises a transmitter, a transmitter shaft, a receiver operated by and synchronously with said transmitter, a pointer rotatable with said receiver, a coöperating pointer coördinate to the pointer of the receiver, an object to be adjusted, means for adjusting said object, said coöperating pointer being positively connected to the object-adjusting means, an auxiliary transmitter operated by the object-adjusting means, an auxiliary receiver operated by and synchronously with said auxiliary transmitter, said auxiliary receiver being provided with a rotating contact arm, contact plates rotatably mounted and operated by the transmitter shaft, signal lamps for indicating the direction of rotation required for the object-adjusting means controlled by said contact arm and contact plates, a series of optical signals, a movable pointer coöperating with said optical signals for indicating the amount of adjustment required for the object, said movable pointer being operatively connected to the object adjusting means and a contact device for selectively controlling said optical signals, part of said contact device being operatable by the transmitter shaft.

3. An apparatus of the class described, comprising a transmitter, a transmitter shaft, a receiver operated by and synchronously with said transmitter, a pointer rotatable with said receiver, a coöperating pointer coördinate to the pointer of the receiver, an object to be adjusted, means for operatively connecting said coöperating pointer to said object, means for adjusting said object, electrical means for indicating the direction of rotation required for the object adjusting means, said means being controlled by a contact device, said contact device being controlled jointly by said object adjusting means and said transmitter shaft, a series of optical signals for indicating the amount of adjustment required for the object, a movable pointer coöperating with said signals, said movable pointer being positively connected to and operated by the object adjusting means, and electrical means controlled by the transmitter shaft for selectively operating the series of optical signals, the ratio of transmission between the transmitter shaft and the electrical means on one hand, and the object adjusting means and the part of the contact device controlled thereby on the other hand, being so fixed that the entire range of adjustment of the transmitter and object-adjusting means are corresponded to by as many revolutions of the said part as there are optical signals.

The foregoing specification signed at Essen, Germany, this 27th day of May, 1920.

Dr. WALTHER AKEMANN.

In presence of—
Hans Gottsmann,
Josef Olbertz.